United States Patent
Maucher et al.

[11] 3,868,099
[45] Feb. 25, 1975

[54] ANNULARLY RESILIENT, CONICALLY SHAPED COMPONENT

[75] Inventors: Paul Maucher, Sasbach; Fritz Lob, Buhl, Baden, both of Germany

[73] Assignee: LuK Lamellen und Kupplungsbau G.m.b.H., Buhl, Baden, Germany

[22] Filed: Sept. 25, 1972

[21] Appl. No.: 292,070

[30] Foreign Application Priority Data
Sept. 25, 1971 Germany............................. 2148043

[52] U.S. Cl. .............................................. 267/161
[51] Int. Cl. .............................................. F16f 1/34
[58] Field of Search .......... 267/161, 160, 162, 164, 267/165

[56] References Cited
UNITED STATES PATENTS
2,565,108  8/1951  Zahadiakin ........................ 267/162
3,098,643  7/1963  Ondrejka .......................... 267/165
3,483,888  12/1969  Wurzel............................. 267/161
3,536,315  10/1970  Jenkin............................. 267/160

Primary Examiner—Robert J. Spar
Assistant Examiner—Kenneth Noland
Attorney, Agent, or Firm—Herbert L. Lerner

[57] ABSTRACT

An annularly resilient component used as a cup spring or the like has inner and outer walls of conical configuration and an annular inner and outer rim. A tab extends generally radially from one of the rims. A wall portion disposed generally at the transitional area between the tab and the rim extends generally transversely of the tab, such wall portion forming an annular continuation of the rim, thereby providing a reduction in stress concentration and prolonging the usable life of such component.

15 Claims, 6 Drawing Figures

ANNULARLY RESILIENT, CONICALLY SHAPED COMPONENT

The invention relates to an annular resilient, conically shaped component and more particularly, to a plate or cup spring provided with extensions or tabs protruding beyond the annular body.

Cup springs of the type in which tabs are provided weather in the form of arms extending beyond the outer peripheral surface and/or extensions, tongues or the like provided at the inner of the annular body are needed for various applications. The tabs or arms are provided for the transmission of torque, to provide for the correct positioning of the cup springs, to provide for the transmission of motion or forces, respectively, arising when they are pushed through, as supports, as levers, as well as for performing other tasks.

Particularly in the case of alternating stress or varying and changing degrees of applied forces, these cup springs are extremely prone to breakage, whereby their utility is limited in that apparatus equipped with such cup springs frequently fail prematurely.

It is an object of the present invention to increase the useful life of cup springs of the type mentioned above, and in particular, to increase the number of permissible alternating-stress cycles before failure, to reduce the danger of breakage, and to open up new fields of application for such cup springs.

It is recognized that fractures frequently occur when cup springs are stressed at the transition of the circular base body of the cup spring and the extensions such as the tabs, arms, tongues or the like. At these transitional regions, areas of high stress concentrations are set up at corners such as at notches or the like and the adverse influence caused by the effect of notches and the like is largely eliminated if these stresses are reduced in the transition region.

According to the invention, the latter is achieved by providing a chamfer or indentation at the conical inner side of a cup spring, such chamfer or indentation extending, at least approximately, into the transitional region of the annular body of the cup spring and the tab and extending generally transversely to the tab.

By using a chamfer or indentation which may be provided in the form of a crease, embossment or reduction in cross section of the material, the adverse influence caused by the effects of notches and the like is largely eliminated at the transitional region by the reduction of the tensile stresses occurring due to the varying degree of applied forces, and the tendency for breakage is thereby decreased, whereby the useful life of such cup springs is several times longer than in those known heretofore.

In forming a chamfer or indentation by providing a reduction of cross sectional thickness, it may be advisable in cases where tabs protrude beyond the inner or outer periphery of the annular body of the cup spring, if the reduction of the cross sectional thickness occurs transversely of the tab and over the entire width of the tab, for instance, in the form of a taper which can run out as a bevel in the region of the annular body of the cup ring.

It has been found that a chamfer or indentation may be advantageously formed by a reduction of the cross sectional thickness as a cut or notch. It is preferred in this connection if the depth of the cut or notch is between 1/10 and ⅗, and preferably in the range of ¼ to ½, of the thickness of the material in which the cut or notch is made within these ranges the optimum compromise between the requirement for optimal remaining strength of the tabs and the useful life of the cup springs is obtained.

The cut which may have a configuration which is triangular, semicircular, elliptical or of some other shape, may be located so that the area of greatest reduction of cross sectional area occurs at the continuation of the peripheral contour of the circular cup spring body. In the case of tabs which extend radially outwardly, the notch or the cut may run along the continuation of the circular outer contour of the cup spring. In the case of radially inwardly directed tabs, for instance cup spring tongues, the notch or the cut runs at least approximately along the continuation of the inner contour of the circular base body of the cup spring, that is, at least approximately in the region of the transition of the body of the cup spring to the tongues of the cup spring.

In some cases it may, however, be advantageous if the region of the greatest cross section reduction is shifted radially relative to the continuations of the outer or inner contour, respectively, of the circular base body in the direction towards the ends of the tabs, arms or tongues.

The configuration of the cut or notch may, however, be in the form of a straight line, that is, the cut may extend, for example, as a tangent or cord to the circular body of the cup spring.

According to a further feature of the invention the areas of the chamfers or indentation facing the annular body may run out into a bevel along the surface forming a part of the circular body of the cup spring. With the straight-line or tangential arrangement of the chamfer or indentation, for instance, in the form of a cut or the like, the radially inner surface of the chamfer may run into a tangential or cord-like bevel of the outer rim of the cup spring, particularly in the case of radially outwardly extending tabs.

The chamfer or indentation in the form of a crease can be made, for instance, by a stamping operation, while the chamfer in the form of a cut, embossment, notch or the like, which is formed by reducing the cross section of the material, can be produced by turning or other machining operation or by material displacement, for instance, by stamping or striking.

Other features which are considered as characteristic for the invention are set forth in the appended claims.

Although the invention is illustrated and described herein as relating to specific embodiments, it is nevertheless not intended to be limited to the details shown, since various modifications and structural changes may be made therein without departing from the spirit of the invention and within the scope and range of equivalents of the claims.

The construction and arrangement of the invention, however, together with additional objects and advantages thereof will be best understood from the following description of specific embodiments when read in connection with the accompanying drawings, in which.

Figure 1:
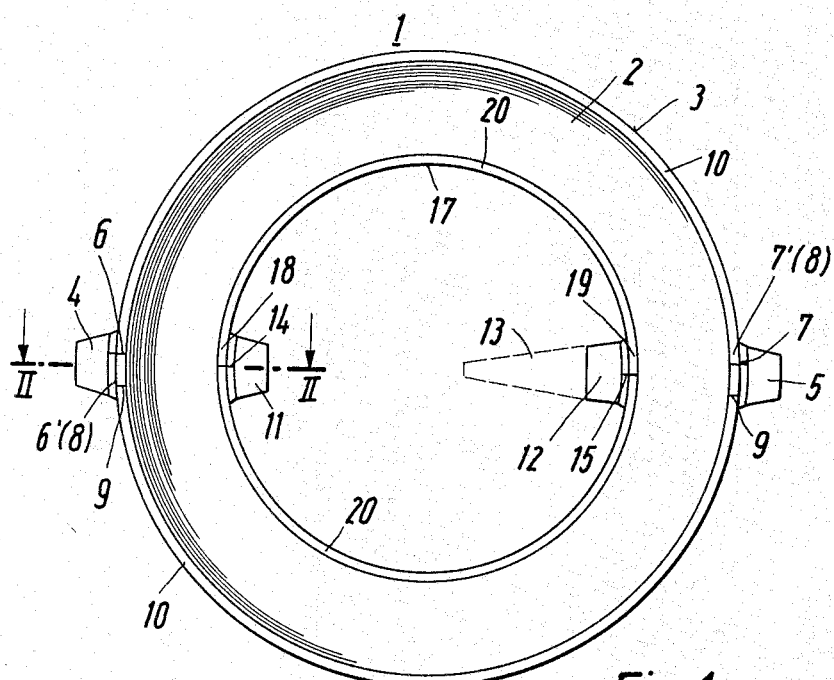
FIG. 1 is a bottom view of a conical cup spring according to one embodiment of the invention.
Figure 2:
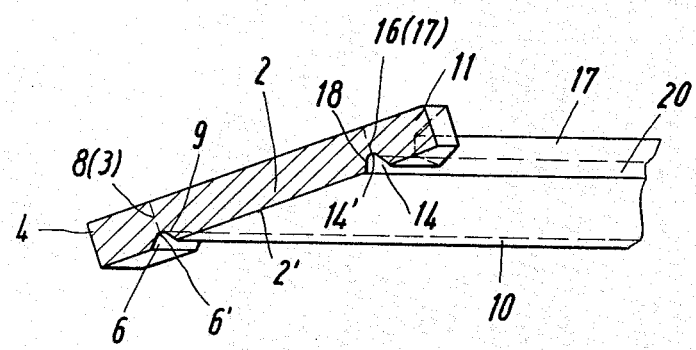
FIG. 2 is a sectional view on a larger scale taken along the line II—II in FIG. 1.
Figure 3:
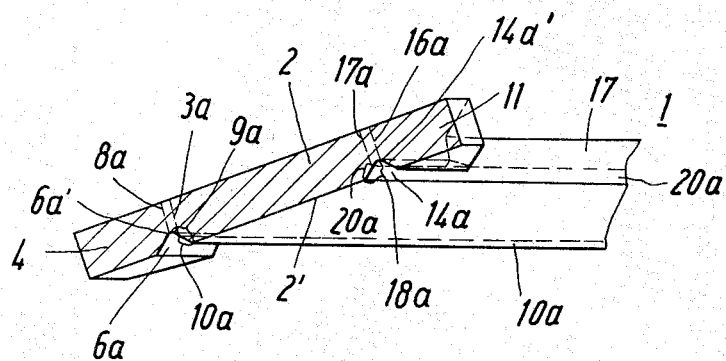
FIG. 3 is a sectional view corresponding to the corss-sectional view of FIG. 2 but relating to an alternate embodiment.

Referring to the drawings, all of the illustrated embodiments disclose cup springs which have extensions or tabs extending generally radially outwardly beyond the outer periphery thereof while the embodiements of FIGS. 1 and 2 and of FIG. 3 disclose cup springs that also have extensions or tabs extending radially inwardly.

FIG. 1 shows a cup spring 1 having an annular body 2 and two extensions or tabs 4,5 extending beyond the circular outer periphery 3 of the annular body 2. The cup spring 1 has a conical shape and FIG. 1 shows the cup spring 1 as it appears from the underside of its conical configuration. It will be seen in the drawings that the inner conical surface 2' of the cup spring 1 is chamfered or indented, that is cut away portions or cuts 6, 7 are provided which extend transversely to each of the tabs 4, 5. The cut away portions 6, 7 are formed by machining or otherwise removing material from the cup spring body 2 or by striking or other forming methods. In the embodiment of FIGS. 1 and 2, the depth of the cut away portions 6, 7 are each about 1/3 of the thickness of the material existing at the point of the cut away portion. As will further be seen in FIG. 2, the region of the greatest reduction of the cross-section is indicated at 8 and this region is generally aligned with the region of the greatest depth of cut indicated at 6' of the cut away portion 6. Also it will be seen that the inner section 9 of the cut away portion 6 is aligned with and forms a continuation of the outer rim 3 of the cup spring.

The tab 5 is constructed and arranged in a similar manner having its greatest reduction of cross-section indicated at 8 and the greatest depth of the cut away portion indicated at 7'. Thus it will be seen that the inner section 9 if the two cut away portions 6, 7 form a continuation of the bevel 10 over the circular outer rim 3 of the cup spring.

As may be desired, inner extensions or tabs 11 and 12 may also provided on the inner periphery of the cup spring. The tabs 11 and 12 may be provided with various cup spring tongues 13 indicated by broken lines. The tabs 11, 12 have cuts or cut away portions 14, 15 respectively extending transversely there-across. The cut away portions 14, 15 may be formed by machining or otherwise removing material from the cup spring body 2 or by striking or other forming methods.

The region of the greatest reduction of the cross section is indicated at 16 and this region is generally aligned with the region of the greatest depth of cut 14'. Also it will be seen that the section 18 of the cut away portion 14 is aligned with and forms a continuation of the inner rim 20 of the cup spring.

The inner tab 12 is constructed and arranged in a similar manner having its greatest reduction of cross section generally aligned with the region of the greatest depth of cut of the cut away portion 15. It will be, seen that the section 18 of the cut 14 and the corresponding section 19 of the cut 15 form a continuation of the bevel 20 over the circular inner rim 17 of the cup body.

In the example of the alternate embodiment according to FIG. 3 it will be seen that the region of the greatest reduction of cross section indicated by the dashed line 8a is shifted and disposed radially outwardly of the dashed line 3a which indicates the shape and contour of the outer periphery 3 of the cup spring. Similarly, the region of the greatest depth of cut 6a' of the cut 6a is shifted radially relative to the outer rim of the cup spring. It will be seen in FIG. 3 that from the intersection of the line 3a with the radially inner contour 9a of the cut 6a on, the inner contour 9a is aligned with and forms a continuation of the bevel 10a, which continues over the circular outer surface of the outer rim of the cup spring.

Also in FIG. 3, in cut away portions 14a, the region of the greatest reduction of cross section indicated by the dashed line 16a is shifted and disposed radially inwardly of the dashed line 17a which indicates the shape and contour of the inner periphery 17 of the cup spring. Similarly, the region of the greatest depth of cut 14a' of the cut 14a is shifted radially relative to the inner rim of the cup spring. It will be seen that from the intersection of the line 17a with the radially outer contour 18a of the cut 14a on, the portion 20a of the radially outer contour 18a of the cut 14a is aligned with and forms a continuation of the bevel 20a which continues over the circular inner surface of the inner rim of the cup spring.

Figure 4:
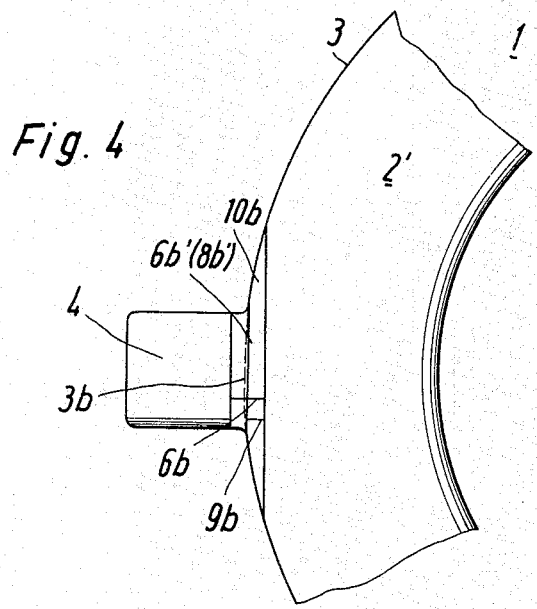
FIG. 4 is a partial bottom view of a conical cup spring according to another alternate embodiment.

FIG. 4 shows another alternate embodiment of the invention, wherein a cut 6b, which may have a cross-sectional shape similar to that shown in FIGS. 2 or 3 extends also on the conical inner side 2' of the cup spring 1 at least approximately in the region of the continuation 3b of the surface of the outer contour 3 transversely to the tab 4. The greatest depth of the cut 6b which is indicated at 6b' is generally aligned with the region of the greatest reduction of cross section indicated at 8b' and runs as a straight line and as a cord or tangent, respectively, relative to the continuation 3b of the outer contour or rim 3. The radially inner region 9b of the cut 6b runs out as a cord like inclined surface at the contour of outer rim 3 at the outermost periphery of the cup spring and thus forms a bevel 10b.

Figure 5:
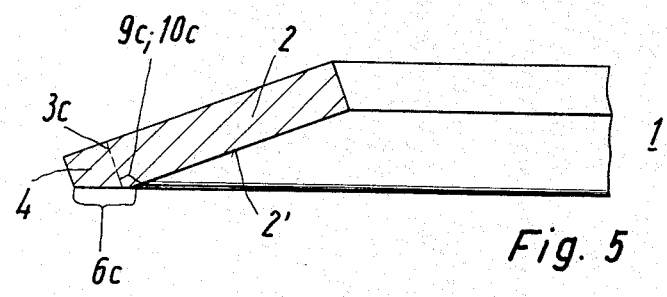
FIG. 5 is a sectional view corresponding to the cross-sectional view of FIG. 2 but relating to a further alternate embodiment.
Figure 6:
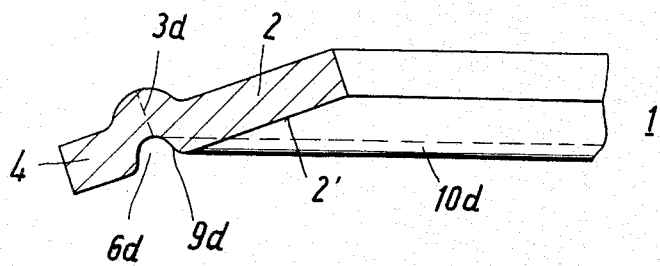
FIG. 6 is a sectional view corresponding to the cross-sectional view of FIG. 2 but relating to yet another alternate embodiment.

FIGS. 5 and 6 are cross-sectional views of cup springs which are provided with radially outward extending tabs 4.

In the embodiment of FIG. 5, a chamfer or bevel 6c extending transversely across the tab 4 has a radially inner region 9c intersecting the outer contour 3c of the cup spring 1, and which continues over the outer periphery of the cup spring. The chamfer 6c is provided at the conical inner side 2' so that a bevel 10c extends continuously over the outer contour of the cup spring.

In the embodiment of FIG. 6, an indentation 6d is formed at least approximately in the transition region between the outer rim 3 of the cup spring and the tab 4. The outer surface of the rim 3 is indicated at 3d. The radially inner area of the indentation 9d extends as a continuation of the bevel 10d along the circular outer contour of the cup spring.

In the embodiments of FIGS. 5 and 6, radially inwardly extending tabs or tongues, respectively, similar to the arms 4 can also be provided with chamfers or indentations as shown in these Figures.

In the embodiment of FIG. 6, as in the embodiments of FIGS. 1 to 5, the tensile stresses occurring in the case of alternating applied forces or varying applied forces are reduced at least generally in the transition region between the body of the cup spring and the tabs in the form of arms or tongues, respectively, by the chamfer or indentation and the adverse influence of the effects of the cuts or cutaway portions is lowered and the danger and likelihood of breakage is greatly decreased.

While the invention has been described by means of a specific example and in a specific embodiment, we do not wish to be limited thereto, for obvious modifications will occur to those skilled in the art without departing from the spirit and scope of the invention.

We claim:

1. An annular resilient component comprising an annular body member having an inner and an outer wall surface of conical configuration and an annular inner and outer rim, and tab means extending from at least one of said rims of said body member, said tab means and said body member defining therebetween a transitional region having a conical inner wall surface portion wherein a chamfer extending transversely to said tab means is formed, said one of said rims defining part of said chamfer.

2. A component according to claim 1, wherein said chamfer is formed by a reduction of the cross section of said transitional region.

3. A component according to claim 2, wherein the reduced cross-section of said transition region continues over the radial extent of said tab means such that said tab means gradually reduce in thickness in a radially inward direction.

4. A component according to claim 1, wherein said chamfer is defined by an undercut section of said body member at said transitional region.

5. A component according to claim 4, wherein a region of greatest reduced cross section of said transitional region forms a continuation of an annular contour of said body member.

6. A component according to claim 4, wherein a region of greatest reduced cross section of said transitional region is disposed radially towards the ends of said tab means relative to the continuation of said annular contour of said body member.

7. A component according to claim 1, wherein the depth of said chamfer is within the range of from 1/10 to 2/3 of the thickness of the material at said transitional region.

8. An annularly resilient component comprising a body member having an inner and outer wall of conical configuration and an annular inner and outer rim, a tab extending generally radially from one of said rims, said component having a wall portion disposed generally at the transitional area between said tab and said one rim and extending generally transversely of said tab, said wall portion forming an annular continuation of said one rim, wherein said wall portion which forms an annular continuation of said one rim is in the form of a continuous annularly extending bevel on the wall defining said one rim.

9. A component according to claim 5, wherein said chamfer extends substantially tangentially to the annular contour of said body member.

10. A component according to claim 9, having radially outwardly extending tab means in the form of arms, and wherein said chamfer is defined by a contour surface facing said body member and running into a chord-like bevel at the outer peripheral region of said body member.

11. A component according to claim 1, wherein said chamfer is formed by removing material from said body member at said transitional region.

12. A component according to claim 1, wherein said chamfer is formed by displacing the material of said body member at said transitional region.

13. A component according to claim 1, wherein said tab means extend radially outwardly of said body member.

14. A component according to claim 1, wherein said tab means extend radially inwardly of said body member.

15. A component according to claim 1, wherein said chamfer is formed by a crease-like bead.

* * * * *